United States Patent
OConnell et al.

(10) Patent No.: US 12,370,823 B1
(45) Date of Patent: Jul. 29, 2025

(54) BOOK CONSTRUCTION WITH DIE-CUT HOLES DEMONSTRATING READILY DECODABLE WORDS IN ONGOING STORY

(71) Applicants: Audrey OConnell, Sussex, NJ (US); Nancy K. OConnell, New York, NY (US); Patricia Kraemer, Owings Mills, MD (US)

(72) Inventors: Audrey OConnell, Sussex, NJ (US); Nancy K. OConnell, New York, NY (US); Patricia Kraemer, Owings Mills, MD (US)

( * ) Notice: Subject to any disclaimer, the term of this patent is extended or adjusted under 35 U.S.C. 154(b) by 0 days.

(21) Appl. No.: 18/961,161

(22) Filed: Nov. 26, 2024

(51) Int. Cl.
| B42D 1/00 | (2006.01) |
| G09B 1/00 | (2006.01) |
| G09B 17/00 | (2006.01) |
| G09B 17/02 | (2006.01) |

(52) U.S. Cl.
CPC .............. B42D 1/004 (2013.01); G09B 1/00 (2013.01); G09B 17/00 (2013.01); G09B 17/02 (2013.01)

(58) Field of Classification Search
CPC ................................. B42D 1/004; G09B 17/02
See application file for complete search history.

(56) References Cited

U.S. PATENT DOCUMENTS

| 3,753,581 | A | * | 8/1973 | Kamstra | B42D 15/0053 |
| | | | | | 283/56 |
| 4,249,757 | A | * | 2/1981 | Gella | G09B 1/00 |
| | | | | | 283/63.1 |
| 2018/0005543 | A1 | * | 1/2018 | Blodgett | G09B 17/02 |
| 2018/0268732 | A1 | * | 9/2018 | Thiel | G09B 17/02 |

FOREIGN PATENT DOCUMENTS

| FR | 2392459 A2 | * | 5/1977 | |
| GB | 2586191 A | * | 2/2021 | G09B 17/02 |

* cited by examiner

Primary Examiner — Kyle R Grabowski

(57) ABSTRACT

The present application is a book construction, designed to be used in multiple children's books, utilizing strategically placed die-cut holes in an ongoing story that can deliver structured and intentional practice in decoding words. This includes identifying alphabet letters, identifying sounds assigned to letters, and identifying sounds assigned to recognizable letter patterns. Every book targets a different recognizable letter pattern and this pattern will be the targeted base for decoding an entire set of words in each book as the story unfolds. Each die-cut hole will split a word into an initial letter sound and the sound assigned to the recognizable letter pattern. Blending these two sounds together creates a new word. The meaning of the new word may be more readily apparent as it appears in the context of a complete sentence in an ongoing story.

1 Claim, 6 Drawing Sheets

BOOK CONSTRUCTION WITH DIE-CUT HOLES DEMONSTRATING READILY DECODABLE WORDS IN ONGOING STORY

PRIOR ART

Die-cut holes have appeared in picture books for well over one hundred years. The Hole Book written and illustrated by the well-known artist, Peter Newell, was published in 1908 by Harper & Row. A simple round die-cut hole over every illustration but the last, added a three-dimensional element to the pictures as they engaged curious readers to follow the trajectory of a bullet that was accidentally fired by a young boy.

The simplicity of his design is its power. The hole is central to the picture element which is always on the right-hand side page of the open book, with the text appearing on the left. When the page is turned, the hole seemingly disappears on the left-hand side page, a small white hole on a white background in-between two lines of text. It hardly appears to be the same size as it appeared only seconds before on the right-hand side in the picture. Your eyes hurry back to the new illustration; the hole has your attention as a new picture comes into focus around it. It is not that the new picture has a hole in it. The hole has a new picture surrounding it. Like a steady spotlight on the right-hand side of a dimly lit stage in a theater, you are aware of activity on the left-hand side, but your anticipatory attention is tied to the spotlight.

The present application is designed to reverse the direction of this time-honored process. The picture elements still appear on the right-hand side page and the text on the left-hand side but the die-cut hole is empty and below the illustrations; you can see your lap through the die-cut hole when you hold the open book and poke your finger through it. What is it doing there? The right-hand side page is turned. The die-cut hole is moving. Where is it going? Your eyes follow like they would a moving spotlight in the theater. The dye-cut hole lands on text. It lands on letters. What do letters have to do with the story? It is not that the words of text have a hole on top of them; it's that the hole now has new words surrounding it.

Since 1908, the traditional purpose of die-cut holes to provide a three-dimensional aspect to illustrations has remained relatively constant and their popularity has soared. An iconic example is Eric Carle's *The Very Hungry Caterpillar*. Published sixty-one years later, now in full color with multiple, round die-cut holes within captivating illustrations, this time, over 55 million readers are following a very hungry caterpillar eating its way to become a most beautiful butterfly.

As the cost of die-cutting itself decreased, cut-out board books used die cutting to change the shape of the books and pages themselves. Trucks, trains, and animal shapes replaced the standard rectangular shape of books. Recently, family word flip books include die-cut pages. Half-moon cut-outs at the bottom of a handful of pages with large, colorful illustrations help focus attention on sparse text underneath the pictures. The pictures dominate the page and the change in page shape is very subtle. The die-cut page itself is designed to blend into the background of the page beneath it. Simple rhymes based on several different sets of family words help young children name what is depicted in the drawings, supporting the development of a sight word vocabulary. Learning sight words is critical to reading. Research suggests we can easily learn over 2,000 words. But literacy depends on knowing between 44,000 to 200,000 words which is only attainable when we learn how the decoding process works.

U.S. Pat. No. 4,249,757, Gella (1981) introduced die-cut holes for older students. This art and education book construction is designed to use multiple die-cut holes per page, movable pages, and die-cuts on both the right-hand and left-hand side pages. This flexibility allows educators to individualize the frequency, placement, and targets for die-cut events. Designed to be readily redesigned depending on students' needs and subject matter, both pictures and whole words are suggested to be interchanged as the focus of the die-cut event for the teaching of semiotics, idioms, languages, and art. (Searching with the help of the New York Public Library researchers, we could not find a published book using this format. However, it is quite possible that this art and education book construction was sold in a template format directly to educators.)

The present application differs from the prior art in distinct ways:

a) The die-cut event departs from a more traditional drill for skill approach that is present in a plethora of prior art designed to support reading and spelling skills in isolation. By embedding the die-cut event within an ongoing story, the implicit experience of integrating divergent reading readiness skills can be made essential to access information to follow the plot and find out what will happen next in the story. The purpose of reading always involves an exchange of information.

b) The die-cut events can allow structured and intentional practice in decoding by using a single recognizable letter pattern to build an entire set of different words, at the same time as an ongoing story unfolds.

c) The die-cut event always ends over a page of text in the story to draw attention to the letters and away from pictures. This increased awareness of print can guide new readers as they transition away from depending on pictures to name words or to follow the story.

d) The die-cut event can provide a tangible experience that may help new readers see the mechanical steps of decoding as a dependable and predictable process, which may increase their intentionality and desire to learn to read printed text.

e) The die-cut event always ends on the left-hand side of the open book which can allow a new reader to experience the action of word building left-to-right which can reinforce the left-to-right eye movement used in reading. The new letters are introduced and appear in front of the dye-cut hole. Decoding and blending the sounds together is a left-to-right activity.

f) The die-cut event presents each new word in the context of a sentence within a story which can make the meaning of the word more readily available. Reading words is purposeful; constructing meaning is integral to the decoding process.

g) The fullness of the storytelling can allow a new reader, when ready, to recognize other words that are deliberately incorporated into the text that are built from the same recognizable letter pattern.

h) The die-cut hole never disappears by becoming sandwiched between other pages or die-cut events. It is dependable, predictable, and always in sight, yet it can still provide an element of surprise as the story continues. New readers may experience a successful reading event from the beginning.

i) The die-cut hole can give tangible form to the mechanical steps of converting written symbols into a word to tell a story. An active learning tool, die-cut holes can demonstrate how words are composed of constituent sounds made by both letters and recognizable letter patterns. Simultaneously, it can support new readers in identifying alphabet letters and the sounds assigned to letters, establishing sound-symbol correspondences. When new readers start to see that words are a combination of speech sounds, they can begin to match the sounds they hear with the printed letters they see. Letters can start to make sounds visible.

j) The singularity of purpose in the die-cut event and the subsequent simplicity of the book construction can make it both easy to read and in easy reach of a mass-market readership.

Current legislation has been passed in states across the country mandating that a more in-depth and systematic approach is incorporated in reading education programs because too many students are reading below grade level. The present application can provide a structured and easy to follow presentation of the decoding process, which is considered fundamental in learning to read by those skilled in the art. By incorporating both an explicit phonetic component and an ongoing story, the present application can be readily used by both parents and teachers to support new readers.

BACKGROUND OF THE INVENTION

The present application is a book construction relating to the teaching of reading.

Fluent readers may sometimes forget the complexities involved in reading. It is easy for us to take for granted that sounds have been assigned to letters. We know which consonants can be blended together to make pronounceable sounds and which ones cannot. We know which adjacent consonants must end and begin separate segments or syllables within a word. We know immediately to scan for vowels, vowel pairs, and for recognizable letter patterns that can reproduce common speech sounds. Fluent readers are not dependent on analyzing every individual letter when they are matching printed text to speech. In fact, fluent readers process words like they process everyday objects.

We all know the conspicuous characteristic of what we call a car. When we are shopping for a new one, we are free to analyze only the newer options and not forced to reanalyze all the stored attributes that we have assigned to the concept "car" to know we are looking at a new one. Recognizable letter patterns are the conspicuous commonalities we see in printed words that let us know we are looking at a valid word. Furthermore, fluent readers intuitively isolate these patterns when they are reading unfamiliar words. Fluent readers know that a relatively small number of speech sounds have been assigned to a larger number of recognizable letter patterns. They understand that a relatively manageable number of print-to-sound relationships can be rearranged in countless sequences to form the magnitude of standalone words that we both read and write with automaticity.

To acquire the skills used by fluent readers, new readers need first to see that words are made up of constituent sounds that act like individual parts. These constituent sounds are blended or joined together to make the words we speak. Sounds are made by single letters, by groups of letters, and by the familiar recognizable letter patterns that help make words pronounceable. When new readers learn that words are made up of constituent sound "parts" and there is a dependable process, the skill of decoding, that allows us to take words apart and put them back together, they are on their way to unlocking the seemingly mysterious way fluent readers match printed text to spoken words. And when new readers are given structured and intentional practice in matching the same recognizable letter pattern to its pronounceable sound, like all fluent readers do, they can begin to lose their dependencies on analyzing every individual letter in matching print to sound and can begin to free up their cognitive resources for comprehension and higher level thinking.

Finally, fluent readers know words derive their meaning in relation to adjacent words. They understand the words "wind" and "produce" in the following sentences because both words are used in context:

a) Let's wind the clock before the wind topples the ladder.

b) Good irrigation systems produce the best produce.

Studies suggests that if new readers are taught to decode words without learning how to construct meaning about what and why they are reading, the purpose of reading as a way to exchange information and process new ideas may be undermined or completely lost. Without strong reading skills, students are less likely to graduate high school. Recent data is showing that poor reading skills do last a lifetime and have a much broader impact, including negative health outcomes, than was previously recognized. It is language that lets us make meaning, build connections, learn, and deepen our self-awareness. Without written language, our inner and outer perceptions can become frozen, creating unwelcome boundaries. Poor reading skills make access to higher educational opportunities more difficult and severely limit one's full participation in the economy.

SUMMARY OF THE INVENTION

The present application, a book construction to be used in multiple books, is designed to address the needs of new readers to develop foundational decoding skills that are fundamental to derive meaning from printed text. The present application utilizes a strategically placed die-cut hole embedded in an ongoing story that can introduce new readers to the sounds assigned to recognizable letter patterns and the critical role that recognizable letter patterns play in decoding words. Each story targets a different recognizable letter pattern, and only one targeted recognizable letter pattern is used throughout each individual story. Over the course of a story, a new reader can experience matching the sound assigned to a targeted recognizable letter pattern to an entire set of words built using the same recognizable letter pattern. But even more importantly, new readers can begin to learn the relationship of words to ideas as they follow the unfolding plot and experience how words working together can tell a story.

What once looked like a solid wall of print may start to be viewed as individual words on a page because the structured and intentional practice of identifying recognizable letter patterns within words can make these patterns easier to recognize in different words, actualizing the process of decoding wherein reading happens.

Figure 1:
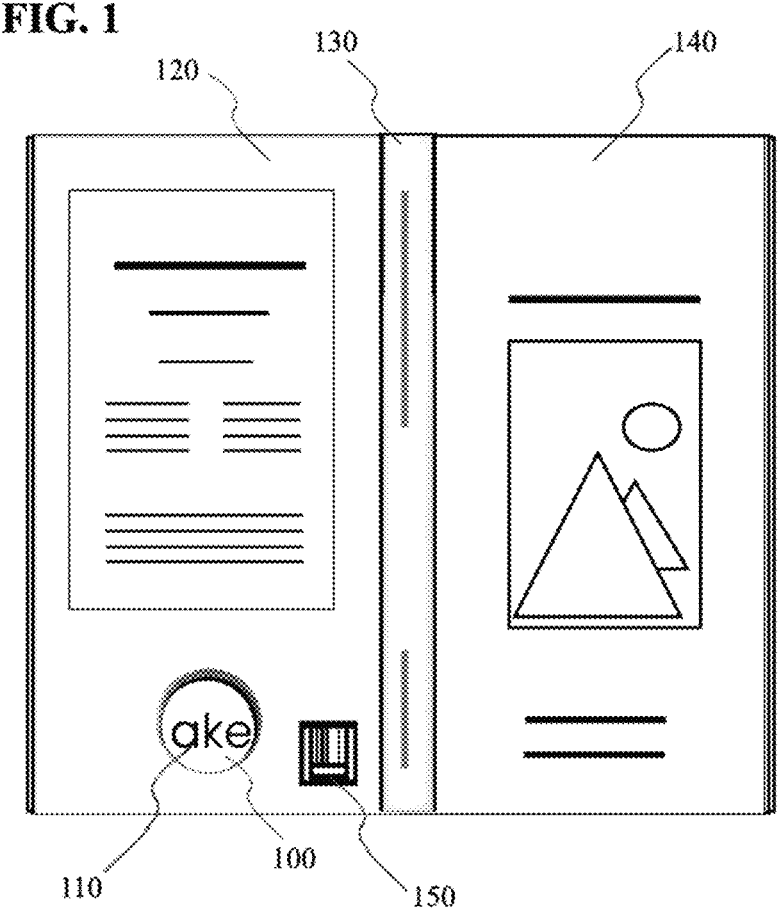
FIG. 1 shows the front and back covers when the book is open and face down.

DRAWING REFERENCE NUMERALS 100 die-cut hole
110 recognizable letter pattern
120 back cover and back cover information
130 book spine
140 front cover and front cover information
150 barcode and ISBN
200 last page of front matter
210 first story page
300 die-cut event
400 new letter or letters
410 story page
420 picture page
500 color-coded words that use recognizable letter pattern
600 sample app on cell phone

DETAILED DESCRIPTION OF THE INVENTION

Figure 6:
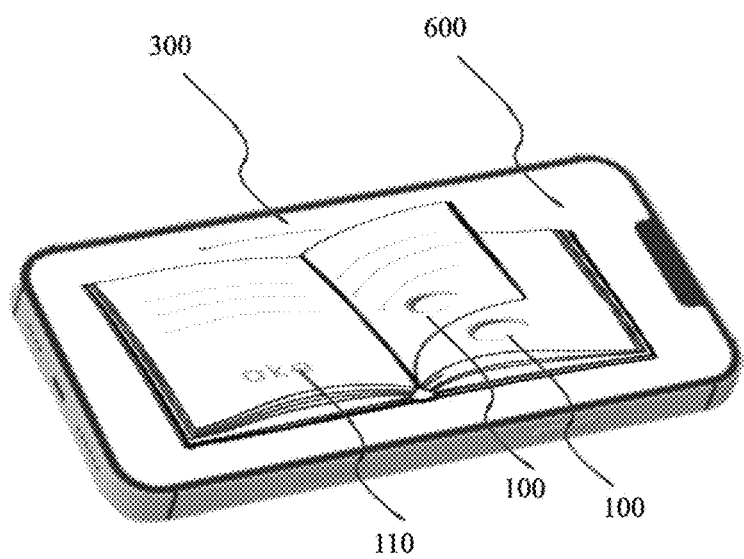
FIG. 6 shows a sample app to display the book on a cell phone.

In the following detailed description, the present application will be described as a physical book with paper pages and printed text that is designed to demonstrate the process of decoding. However, like all physical books with paper pages today, the present application could easily be formatted for flat-screen electronic devices such as cell phones 600 or tablets as illustrated in FIG. 6. The die-cut event 300 is easily simulated graphically.

As illustrated in FIG. 1, the present application is a book construction that has a front cover 140, back cover 120, book spine 130, and a plurality of pages in-between. The binding can be either glued, saddle stitched, wire bound, or other method as understood by those skilled in the art. The labeled elements contain the appropriate information: front cover 140 has title, cover art, author; back cover 120 has back cover information, and bar code and ISBN 150. The distinctive and advantageous elements in FIG. 1 are the die-cut hole 100 and the recognizable letter pattern 110 that is visible through the die-cut hole 100. These elements immediately alert potential readers to the interior design of the book construction and to the identity of a recognizable letter pattern 110 that will form decodable words in an ongoing story.

Figure 2:
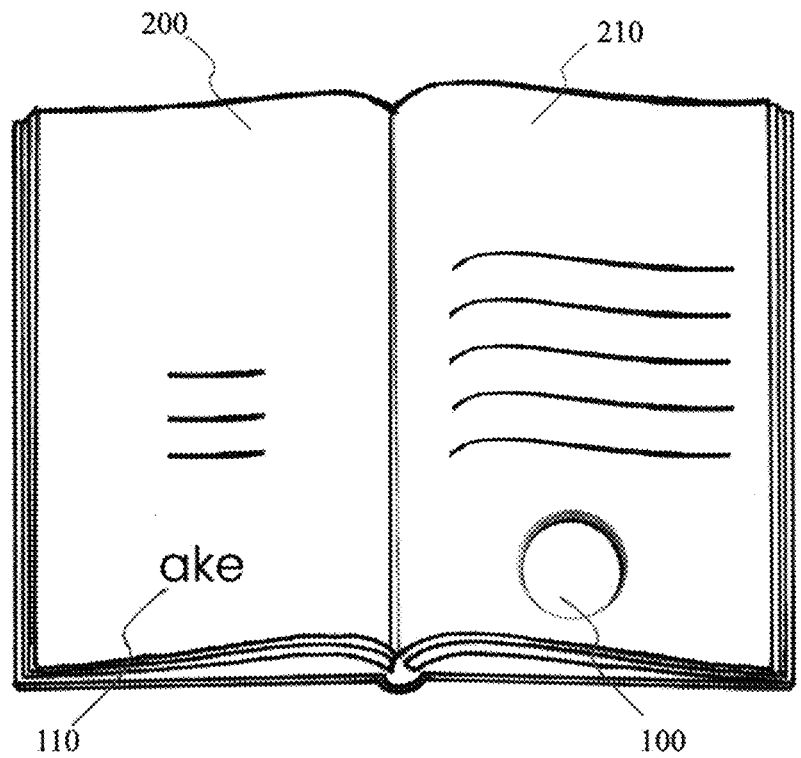
FIG. 2 shows the book opened to the first story page.

As illustrated in FIG. 2, the last page of the front matter 200 has a recognizable letter pattern 110 printed to be vertically and horizontally aligned so that it will be visible within the die-cut hole 100 through all of the story pages and through the back cover as well.

The story starts on the right-hand side page of the open book where the text appears on the first story page 210 above a curiously empty die-cut hole 100.

Figure 3:
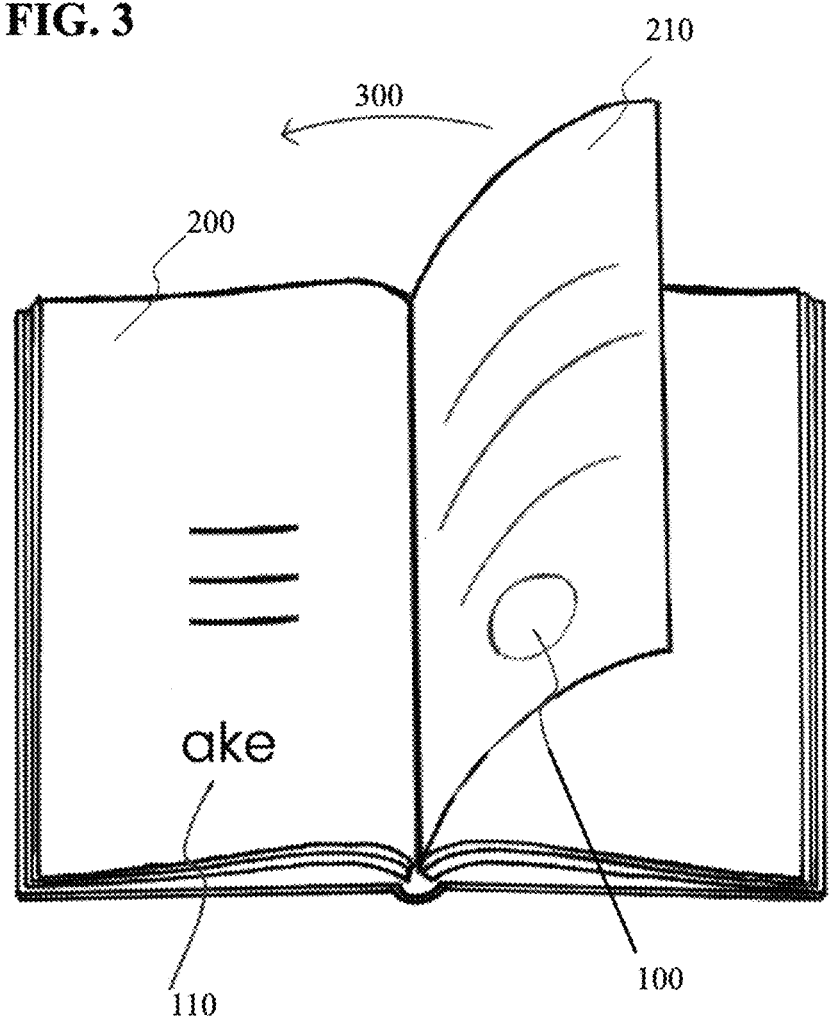
FIG. 3 shows the start of a die-cut event as the first story page is turned.

The kinetic element of a die-cut event 300 is illustrated in FIG. 3. As the first story page 210 is turned, the transitional motion that allows this right-hand side page to become the next left-hand side page will start a die-cut event 300 as a recognizable letter pattern 110 is about to be seen through the die-cut hole 100.

Figure 4:
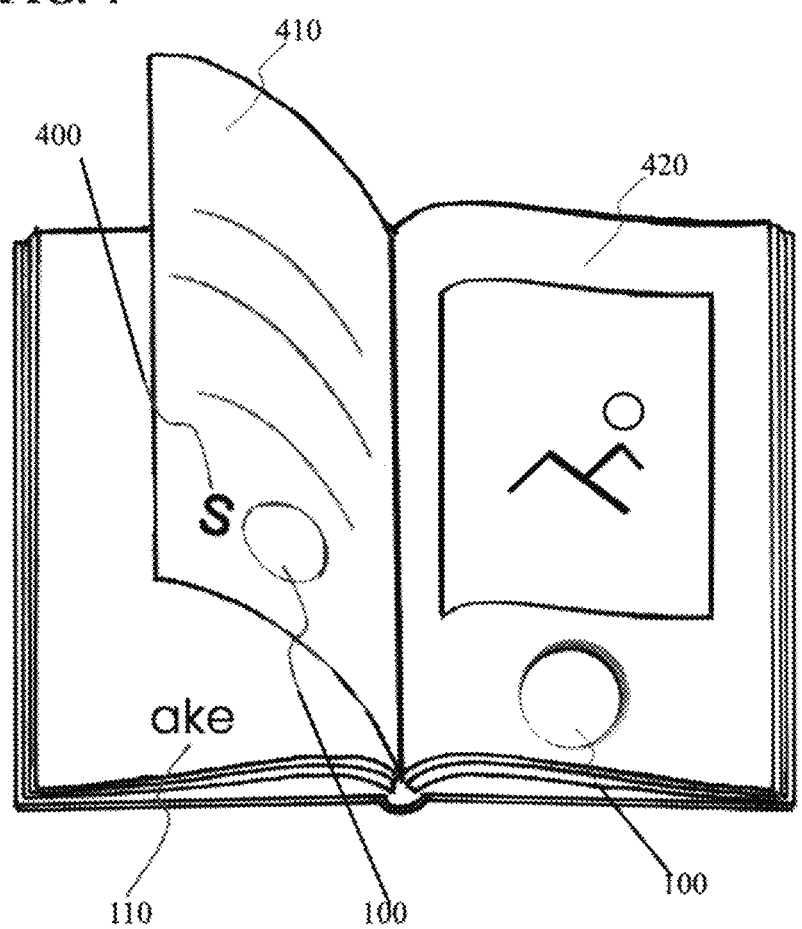
FIG. 4 shows the ending of a die-cut event as the new letter or letters come into view.

FIG. 4. Meanwhile, the new letter or letters 400 that are associated with the initial sound of the next upcoming word that will complete the last sentence on a story page 410 of text have come into view alongside a picture page 420. As the page settles, the die-cut event 300 will complete and a recognizable letter pattern 110 will suddenly become visible. Now, a new word is ready to look at and say. Blending or joining the sounds together can occur from left-to-right to decode the new word and propel an ongoing story forward.

Figure 5:
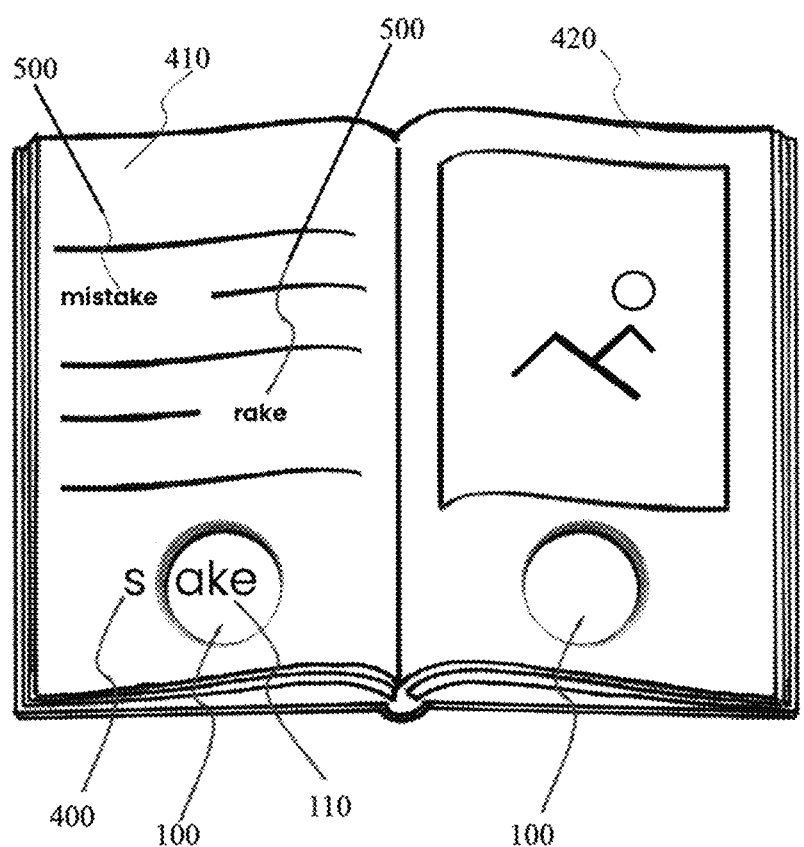
FIG. 5 shows a finished die-cut event and the color-coded words that use the same recognizable letters pattern that is targeted in the story.

As illustrated in FIG. 5, the die-cut event 300 will repeat to the end of the book as every page is turned and a story page 410 of text will be the left-hand side page and a picture page 420 will be on the right. Additionally, all words in the stories that contain the recognizable letter pattern 110 are color coded 500, appearing in a different color ink than is used for the body of the text. The body of text always uses a clear and easy to read font that correlates with the letter shape children learn to print.

The present application can demonstrate decoding in a predictable and easy-to-follow visual presentation. New readers may begin to see decoding as a dependable process and a key to unlocking the seemingly mysterious symbols printed on a page.

We claim:

1. A book construction designed to create readily decodable words in an ongoing story comprising:
   (a) a curated set of rhyming words wherein the constituent rhyming sound is formed using an identical letter pattern which will become a targeted pattern for decodable words in a book wherein the set of rhyming words is inclusive enough that an ongoing story can be told using each word on a different page in a sentence that will appear on consecutive left-hand pages of the open book;
   (b) a strategically placed series of aligned die-cut holes that cut through sequential pages to expose the targeted pattern each time it appears in the new rhyming word through the individual die-cut hole on the left-hand side of the open book;
   (c) the targeted pattern is printed once on a left-hand page near the front of the book, wherein it becomes visible through each individual die-cut hole as the kinetic motion of turning a right-hand page over to become a left-hand page of the open book is completed;
   (d) an initial letter/letters of the rhyming words printed on consecutive left-hand pages to be vertically and horizontally aligned in front of the targeted pattern when it becomes visible through the die-cut holes wherein the letter/letters will appear together with the targeted pattern as the new single word in the sentence that is intrinsic to advance the plot of the ongoing story;
   (e) additional words, deliberately included in the story wherein the same constituent rhyming sound occurs using the targeted pattern, to be printed in a different color ink from the rest of the words in the text to support the recognition of the targeted pattern; and,
   (f) a back cover that contains one of the aligned die-cut holes that makes visible the targeted letter pattern as a standalone, pronounceable sound that will form a base for the decodable words in the book.

* * * * *